United States Patent [19]

Sherbondy et al.

[11] Patent Number: 5,439,611
[45] Date of Patent: Aug. 8, 1995

[54] STABILIZATION OF HYDROXYALKYLIDENE PHOSPHONATE SCALE INHIBITORS AGAINST DEGRADATION BY BROMINE AND CHLORINE BIOCIDES

[75] Inventors: Ann M. Sherbondy, Pittsburgh; Daniel P. Vanderpool, Coraopolis, both of Pa.

[73] Assignee: Calgon Corporation, Pittsburgh, Pa.

[21] Appl. No.: 327,211

[22] Filed: Oct. 21, 1994

Related U.S. Application Data

[63] Continuation of Ser. No. 880,113, May 7, 1992, abandoned.

[51] Int. Cl.$^6$ ............................ C02F 5/10; C02F 5/14
[52] U.S. Cl. .................................................. 252/180
[58] Field of Search ............... 252/180, 181, 142, 102; 210/699, 753

[56] References Cited

U.S. PATENT DOCUMENTS

| | | | |
|---|---|---|---|
| 2,552,490 | 5/1951 | Marks et al. | 210/755 |
| 2,552,491 | 5/1951 | Marks et al. | 210/755 |
| 3,170,883 | 2/1965 | Owen et al. | 252/142 |
| 3,558,503 | 1/1971 | Goodenough et al. | 210/755 |
| 3,666,664 | 5/1972 | Lorenc et al. | 252/180 |
| 4,642,194 | 2/1987 | Johnson | 210/699 |
| 4,673,509 | 6/1987 | Davis et al. | 210/699 |
| 4,711,724 | 12/1987 | Johnson | 210/699 |
| 4,759,852 | 7/1988 | Trulear | 210/699 |
| 5,049,304 | 9/1991 | Greaves | 252/180 |
| 5,069,798 | 12/1991 | Hwa et al. | 252/180 |
| 5,093,005 | 3/1992 | Greaves t al. | 252/180 |
| 5,338,477 | 8/1994 | Chen et al. | 252/180 |
| 5,358,642 | 10/1994 | Chen et al. | 210/700 |
| 5,378,372 | 1/1995 | Carey et al. | 210/697 |

*Primary Examiner*—Prince Willis, Jr.
*Assistant Examiner*—James M. Silbermann
*Attorney, Agent, or Firm*—Craig G. Cochenour; William C. Mitchell; Raymond M. Speer

[57] ABSTRACT

Hydroxyalkylidene phosphonates, which give excellent inhibition of the formation, deposition and adherence of scale-forming salts, especially calcium carbonate, in aqueous systems, are degraded by the oxidizing biocides bromine and chlorine used to control microbial growth in such aqueous systems. It has been found that organic sulfonamides provide excellent protection against such degradation when they are added to the aqueous system along with the hydroxyalkylidene phosphonate scale inhibitors.

17 Claims, No Drawings

STABILIZATION OF HYDROXYALKYLIDENE PHOSPHONATE SCALE INHIBITORS AGAINST DEGRADATION BY BROMINE AND CHLORINE BIOCIDES

This is a continuation of application Ser. No. 07/880,113, filed on May 7, 1992, now abandoned.

BACKGROUND OF THE INVENTION

1. Field of the Invention

The present invention relates to compositions and methods for inhibiting the degradation of hydroxyalkylidene phosphonate scale inhibitors by the oxidizing biocides bromine and chlorine in an aqueous system where said phosphonates have been added to prevent the formation, deposition and adherence of alkaline earth metal scale deposits, especially calcium carbonate ($CaCO_3$) scale deposits, on metallic surfaces of said aqueous systems, e.g., cycled up recirculating cooling systems, where the biocide, most likely bromine, has been added to said aqueous system in order to control the growth of microbes in said system.

In order for the hydroxyalkylidene phosphonate scale inhibiting compositions described further below to prevent the formation and deposition of scale in such an aqueous system, they must maintain a level of resistance to degradation by the oxidizing biocide, especially bromine. This is of particular importance in cooling systems such as those using cycled up recirculating cooling towers, where bromine is usually used in preference to chlorine.

Such systems maintain a large body of water for a considerable length of time exposed to the atmosphere under conditions which do not include sufficient aeration and exposure to sunlight to provide control of microbial, especially bacterial and fungal, growth. In particular, many cooling towers use fill composed of beads of synthetic polymer or other materials, in order to extend the amount of heat exchange surface area, and this type of construction greatly aggravates the problem of microbiological growth, since it provides an ideal physical environment for the propagation of troublesome microbes. Unchecked, such microorganisms flourish and produce colonies extensive enough to give rise to problems of biofilm blockage of heat exchange surfaces, as well as clogging of the components of the water transporting apparatus used in operating the cooling system.

As already indicated, such problems of unwanted microbial growth in a cooling system are usually solved by use of an oxidizing biocide, especially chlorine or bromine, since these are inexpensive, effective, and produce minimal environmental impact. However, as is well known, such oxidizing biocides also tend to degrade scale inhibitors containing a hydroxyalkylidene phosphonate group, presumably by oxidative attack in which the hydroxy group plays a role, with resultant cleavage through the alkylidene group and release of phosphate $PO_4^{-3}$ ions. This attack on the hydroxyalkylidene phosphonate scale inhibitor produces detrimental results in three ways. First, there is a loss of the phosphonate scale inhibitor product itself, with consequent scale buildup. Second the $PO_4^{-3}$ ions which are released react with calcium cations to form calcium phosphate scale, a very hard and intractable scale. Third, the $PO_4^{-3}$ ions also adversely modify the adherence properties of the calcium carbonate scale whose formation and deposition the phosphonate scale inhibitor was intended to prevent in the first place.

The Hydroxyalkylidene Phosphonate Scale Inhibitors and Their Use in Controlling Calcium Carbonate Scale Generally, calcium carbonate scale deposits are incrustation coatings which accumulate on the metallic surfaces of a water-carrying system through a number of different causes.

Various industrial and commercial water-carrying systems are subject to calcium carbonate scale formation problems. Calcium carbonate scale is of particular concern in heat exchange systems employing water, such as, for example, boiler systems, and once-through and open recirculating water cooling systems. Cooling towers are especially significant.

The water employed in these systems ordinarily will contain a number of dissolved salts, and the alkaline earth metal cation calcium is usually prevalent, as is the anion carbonate. The combination product of calcium cation and carbonate anion will precipitate from the water in which they are carried to form scale deposits when the concentration of the anion and cation comprising the reaction product, i.e., calcium carbonate, exceeds the solubility of the reaction product itself. Thus, when the concentrations of calcium ion and carbonate ion exceed the solubility of the calcium carbonate reaction product, a solid phase of calcium carbonate will form as a precipitate. Precipitation of the reaction product will continue until the solubility product concentrations of the constituent ions are no longer exceeded.

Numerous factors may be responsible for producing a condition of supersaturation for the reaction product calcium carbonate. Among such factors are changes in the pH of the water system, evaporation of the water phase, rate of heat transfer, amount of dissolved solids, and changes in the temperature or pressure of the system.

For cooling and boiler systems and similar heat exchange systems including cooling towers, the mechanism of scale formation is apparently one of crystallization of scale-forming salts from a solution which is locally supersaturated in the region adjacent the heating surface of the system. The thin viscous film of water in this region tends to become more concentrated than the remainder of the solution outside this region. Precipitation is also favored on the heat transfer surface because of the inverse solubility relationship of calcium carbonate. As a result, the solubility of the scale-forming calcium carbonate salt reaction product is first exceeded in this thin film, and crystallization of calcium carbonate scale results directly on the heating or heat exchange surface.

In addition to this, a common source of scale in boiler systems is the breakdown of calcium bicarbonate to form calcium carbonate, water and carbon dioxide under the influence of heat. For open recirculating cooling water systems, in which a cooling tower, spray pond, evaporative condenser, and the like serve to dissipate heat by evaporation of water, the chief factor which promotes calcium carbonate scale formation is concentration of solids dissolved in the water by repeated evaporation of portions of the water phase. Thus, even a water which is not scale forming on a once-through basis usually will become scale forming when concentrated two, four, or six times.

The formation of calcium carbonate scale deposits poses a serious problem in a number of regards. The calcium carbonate scale which is formed possesses a low degree of heat conductivity. Thus, a calcium carbonate scale deposit is essentially an insulating layer imposed across the path of heat travel from whatever source to the water of the system. In the case of a boiler system the retarded heat transfer causes a loss in boiler efficiency. Increased input of heat to compensate for this loss results in overheating of the boiler metal and consequent tube failures. In addition to retarded heat transfer, calcium carbonate scale formation also facilitates underdeposit corrosive processes, and material interference with fluid flow. Consequently, calcium carbonate scale is an expensive problem in many industrial water systems, causing delays and shutdowns for cleaning and removal.

Although the present invention is directed primarily to preventing or inhibiting the deposition of calcium carbonate scale, the most prevalent type of scale deposit, it is also applicable to inhibiting the deposition of other types of alkaline earth metal scales. For example, most industrial and commercial water contains alkaline earth metal cations, such as calcium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until their product solubility concentrations are no longer exceeded. These precipitates are alkaline earth metal scales. Thus, by alkaline earth metal scales is meant scales including but not limited to calcium carbonate, magnesium carbonate, calcium phosphate, and calcium sulfate. These scales form frequently in the tubes of heat exchangers and on other heat exchange surfaces.

The hydroxyalkylidene phosphonates described herein can be used in the same range of amounts as threshold inhibitors to prevent the formation and deposition of calcium carbonate and other alkaline earth metal scales. They also have dispersant properties as well, particularly when combined with polymer additives described further below, and significantly reduce the adherency of any calcium carbonate scale deposit which is formed, facilitating its easy removal.

Scale-forming compounds can be prevented from precipitating by inactivating their cations with chelating or sequestering agents, so that the solubility of their reaction products is not exceeded. Generally, this requires many times as much chelating or sequestering agent as cation, since chelation is a stoichiometric reaction, and these amounts are not always desirable or economical. However, several decades ago, it was discovered that certain inorganic polyphosphates would prevent such precipitation when added in amounts far less than the concentrations needed for sequestering or chelating.

When a precipitation inhibitor is present in a potentially scale-forming system at a markedly lower concentration than that required for sequestering the scale-forming cation (stoichiometric), it is said to be present in "threshold" amounts. See, for example, Hatch and Rice, *Indust. Eng. Chem.*, 31, 51–53 (1939); Reitemeier and Buehrer, *J. Phys. Chem.*, 44 (5), 535–536 (1940); Fink and Richardson U.S. Pat. No. 2,358,222; and Hatch, U.S. Pat. No. 2,539,305.

Generally, sequestering takes place at a weight ratio of sequestration compounds to scale-forming cation components of about 5–10:1, depending on the anion components in the water. Threshold inhibition generally takes place at a weight ratio of threshold active compounds to scale-forming cation components of less than about 1:20.

Similarly, anionic and cationic polymers can be used as dispersants in accordance with methods known in the art, but the dosage levels necessary to achieve dispersion are in the range of 0.5–1.0% by weight of the system being treated, which is many orders of magnitude higher that the dosage levels used for the compositions of the present invention. Thus, it is a unique aspect of the present invention that it is possible to achieve essentially non-adherent scale using only threshold inhibitor dosage levels of the compositions of the present invention.

Severity of the scaling tendency of a water sample is measured using the saturation index, which may be derived in accordance with the following equation:

$$SI = \frac{[Ca^{2+}][CO_3^{2-}]}{K_{sp}CaCO_3}$$

where SI is the saturation index for calcium carbonate, $[Ca^{2+}]$ is the concentration of free calcium ions, $[CO_3^{2-}]$ is the concentration of free carbonate ions, and $K_{sp}CaCO_3$ is the conditional solubility product constant for $CaCO_3$. All of the quantities on the right side of the above equation are adjusted for pH, temperature and ionic strength.

Calculation and use of the saturation index, and generation of the data from which it is derived, are matters within the skill of the art. See, for example, *Critical Stability Constants*, Vol. 4: "Inorganic Complexes", Smith & Mantell (1976), Plenum Press; and *Aquatic Chemistry*, Chap. 5, 2nd ed., Stumm & Morgan (1981), Wiley & Sons.

Chlorine and Bromine Biocides

Chlorine and bromine are the most frequently used oxidizing biocides in aqueous sytems where an antifouling agent is necessary to control the growth of microorganisms, as has already been described further above. The biocidal activity of low concentrations of chlorine and bromine in water is influenced to a considerable extent by factors such as pH, temperature, and the presence of other halides and nitrogen compounds. An important consideration in choosing one halogen over the other is the effect of pH on shifting of the equilibrium mixture formed by reaction of the halogen with water to give the halogen, the strongly dissociated hydrogen halide, and the weakly dissociated hypohalous acid.

Because bromine has higher biocidal efficiency than chlorine at the high pH's (8.5 and above) encountered in aqueous systems such as cooling towers, bromine is the preferred halogen in those systems. Since the hydroxyalkylidene phosphonates described herein have been found to function surprisingly well as scale inhibitors under the severe conditions, including high pH, found in such aqueous systems, the present invention is concerned primarily with stabilizing those phosphonates against degradation by bromine. However, because it is also possible that chlorine, or a combination of bromine and chlorine may be employed in such systems, it is also within the scope of the present invention to stabilize those phosphonates against degradation by chlorine as well.

The chlorine and bromine biocides are added to the aqueous systems being treated in accordance with well-known procedures using various chlorine- and bromine-releasing agents, and sometimes the free halogen itself. For example, in the case of chlorine, gaseous chlorine may be fed directly into the water of the aqueous system, or it may be introduced by addition of the sodium or calcium hypochlorite salt, or other chlorine donors which are commonly used. For bromine, suitable bromide salts which may be used include the alkali and alkaline earth metal bromides, e.g., magnesium bromide, calcium bromide, sodium bromide, potassium bromide, ammonium bromide, especially crystalline sodium bromide dihydrate, etc. Such matters, however, do not form any part of the present invention, which is concerned with certain organic sulfonamides and their use with the hydroxyalkylidene phosphonates described herein to inhibit or prevent the degradation of the latter by the various active species which result from the presence of chlorine and/or bromine in an aqueous system under severe conditions.

The Organic Sulfonamide Stabilizers

The search for agents useful in inhibiting the degradation of the hydroxyalkylidene phosphonate scale inhibitors described herein under the severe conditions typically encountered in, e.g., cycled up recirculating cooling towers, has been complicated by (1) unpredictability and a poorly understood underlying mechanism of action, so that different results are obtained using the same candidate stabilizer but different phosphonate scale inhibitors; (2) the further requirement that the chlorine and bromine not be irreversibly bound by the stabilizing agent employed, so that they can continue their basic biocidal action in the aqueous system, and the corresponding degree to which the stabilizing agent is able to release the chlorine and bromine; and (3) the often different results obtained with chlorine and bromine, due to the complex effect of pH, temperature and other factors, thus further increasing unpredictability.

For example, it may be theorized that the mode of action of the stabilizing agent is reaction with hypobromous acid to form a bromamine, which would give an expected order of effectiveness of candidate stabilizers of urea>dimethylhydantoin>sulfamic acid. But, with the widely used phosphonate scale inhibitor hydroxyethylidene-1,1-diphosphonate (HEDP), virtually the opposite order of effectiveness was found, i.e., dimethylhydantoin was almost ineffective, urea gave some benefit, and sulfamic acid was highly effective. On the other hand, when sulfamic acid was tried with the hydroxyalkylidene phosphonates described herein, it was found to be less effective in preventing degradation of said phosphonates by bromine than the organic sulfonamides of the present invention. While resorcinol is often found to be effective in preventing degradation of certain phosphonates by bromine, so little bromine remains in solution that any aqueous system in which it is used would probably experience unacceptable biofouling.

2. Brief Description of the Prior Art

Polyether polyamino methylene phosphonates used as the scale inhibiting active ingredient along with the organic sulfonamide stabilizing agents in the compositions of the present invention, are described in copending application Ser. No. 07/879,639, filed May 7, 1992, (Attorney Docket No. C-1561). However, the polyether phosphonates therein are used for the control of calcium carbonate scale under severe conditions which include elevated pH and high calcium carbonate saturation levels; and there is no suggestion of combining hydroxyalkylidene phosphonates of the type used in the present invention, which do not function well under severe conditions, with organic sulfonamide agents to provide improved resistance to degradation by oxidizing biocides.

U.S. Pat. Nos. 4,642,194 and 4,711,724 disclose methods for preventing decomposition by chlorine of certain specific phosphonate scale inhibitors, including HEDP and AMP, using sulfamic acid and cyanuric acid, respectively. However, there is no suggestion of the organic sulfonamide stabilizing agents of the present invention.

U.S. Pat. No. 4,759,852 discloses the use of sulfamic acid to prevent the decomposition of phosphonate scale inhibitors in cooling waters treated with a combination of chlorine and a bromide salt which releases bromide ions. Only sulfamic acid is disclosed, and there is no suggestion of the organic sulfonamides stabilizing agents of the present invention.

While the organic sulfonamides which are an essential part of the stabilizing compositions and methods of the present invention are for the most part known compounds, there is no suggestion in the prior art that they would be useful for preventing the degradation by chlorine and/or bromine of the hydroxyalkylidene phosphonate scale inhibitors described herein, when used to prevent scale in aqueous systems. Furthermore, organic sulfonamides may become ineffective as stabilizers due to precipitation by calcium or other cationic species such as magnesium, iron, manganese, silica, etc.

SUMMARY OF THE INVENTION

The present invention relates to an organic sulfonamide stabilizing composition for inhibiting the degradation of hydroxyalkylidene phosphonate scale inhibitors of the formula:

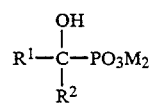

where M is hydrogen or a suitable cation; and $R^1$ and $R^2$ may be the same or different and each is independently selected from:
a) hydrogen: H;
b) carboxylic acid and alkyl esters: —COOR$^3$, where $R^3$ is hydrogen or $C_{1-4}$alkyl;
c) $C_{1-4}$alkoxy;
d) phosphonate/alkylene phosphate: $(CH_2)_n PO_3 M_2$, where n is 0–4;
e) $C_{1-4}$alkyl, optionally monosubstituted by $R^4$, where $R^4$ is hydroxyl, carboxyl and $C_{1-4}$alkyl esters thereof, and $C_{1-4}$alkoxy;
f) phenyl and phenyl$C_{1-4}$alkyl, optionally monosubstituted by $R^4$, where $R^4$ is as defined above;

SAID DEGRADATION taking place in an aqueous system subject to the formation, deposition and adherence of scale imparting compounds, and being caused by a biocide present in said system comprising chlorine or bromine or mixtures thereof;

SAID ORGANIC SULFONAMIDE for addition to said aqueous system comprising a compound of the formula:

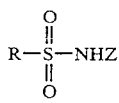

wherein:
Z is selected from hydrogen; and alkali and alkaline earth metal salt-forming ions; and
R is selected from the group consisting essentially of:
a) $C_{1-4}$alkoxy radical: —$OC_{1-4}$alkyl;
b) an amino group, or a mono($C_{1-4}$alkyl)amino or di ($C_{1-4}$alkyl)amino group: —$N(R^1)R^2$, where $R^1$ and $R^2$ are as defined above;
c) a formylamino group: —NHC(O)H;
d) ($C_{1-4}$alkyl)carbonylamino radical: —NH-C(O)$C_{1-4}$alkyl;
e) ($C_{1-4}$alkoxy)carbonylamino radical: —NH-C(O)O$C_{1-4}$alkyl;
f) $C_{2-6}$alkenyl radical;
g) $C_{2-6}$alkynyl radical;
h) $C_{3-7}$cycloalkyl radical;
i) aryl or heteroaryl selected from the group consisting essentially of phenyl, naphthyl, pyridyl, pyrimidyl, pyrazyl, pyridazyl, pyrrolyl, imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl; $C_{1-4}$alkoxy; $C_{1-4}$alkoxycarbonyl; halo; nitro; nitrillo; carboxy; $C_{1-4}$alkylsulfonyl radical: —$S(O)_nC_{1-4}$alkyl, where n=2; and a sulfamoyl group which is unsubstituted or substituted on the nitrogen by one or two $C_{1-4}$alkyl groups: —$SO_2N(R^1)R^2$, where $R^1$ and $R^2$ are as defined above; and wherein the nitrogen atom(s) of the heteroaryl is (are) optionally substituted by $C_{1-4}$alkyl or $C_{1-4}$alkylsulfonyl radical: —$S(O)_nC_{1-4}$alkyl, where n=2;
j) $C_{1-4}$alkyl radical; and
k) $C_{1-4}$alkyl monosubstituted by one of the substituents a) through i) above.

The present invention further relates to a composition useful as a deposit control agent to control the formation, deposition and adherency of scale imparting compounds in an aqueous system containing a biocide comprising chlorine, bromine or mixtures thereof which tends to degrade said deposit control agent;
COMPRISING, IN COMBINATION:
A) a hydroxyalkylidene phosphonate deposit control agent of the following formula:

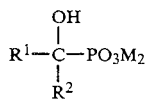

where M is hydrogen or a suitable cation; and $R^1$ and $R^2$ may be the same or different and each is independently selected from:
a) hydrogen: H;
b) carboxylic acid and alkyl esters: —$COOR^3$, where $R^3$ is hydrogen or $C_{1-4}$alkyl;
c) $C_{1-4}$alkoxy;
d) phosphonate/alkylene phosphonate: $(CH_2)_nPO_3M_2$, where n is 0-4;
e) $C_{1-4}$alkyl, optionally monosubstituted by $R^4$, where $R^4$ is hydroxyl, carboxyl and $C_{1-4}$alkyl esters thereof, and $C_{1-4}$alkoxy;
f) phenyl and phenyl$C_{1-4}$, optionally monosubstituted by $R^4$, where $R^4$ is as defined above;
B) an organic sulfonamide stabilizing agent which inhibits degradation of component A) above, of the formula:

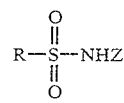

wherein:
Z is selected from hydrogen; and alkali and alkaline earth metal salt-forming ions; and
R is selected from the group consisting essentially of:
a) $C_{1-4}$alkoxy radical: —$OC_{1-4}$alkyl;
b) an amino group, or a mono($C_{1-4}$alkyl)amino or di ($C_{1-4}$alkyl)amino group: —$N(R^1)R^2$, where $R^1$ and $R^2$ are as defined above;
c) a formylamino group: —NHC(O)H;
d) ($C_{1-4}$alkyl)carbonylamino radical: —NH-C(O)$C_{1-4}$alkyl;
e) ($C_{1-4}$alkoxy)carbonylamino radical: —NH-C(O)O$C_{1-4}$alkyl;
f) $C_{2-6}$alkenyl radical;
g) $C_{2-6}$alkynyl radical;
h) $C_{3-7}$cycloalkyl radical;
i) aryl or heteroaryl selected from the group consisting essentially of phenyl, naphthyl, pyridyl, pyrimidyl, pyrazyl, pyridazyl, pyrrolyl, imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl; $C_{1-4}$alkoxy; $C_{1-4}$alkoxycarbonyl; halo; nitro; nitrillo; carboxy; $C_{1-4}$alkylsulfonyl radical: —$S(O)_nC_{1-4}$alkyl, where n=2; and a sulfamoyl group which is unsubstituted or substituted on the nitrogen by one or two $C_{1-4}$alkyl groups: —$SO_2N(R^1)R^2$, where $R^1$ and $R^2$ are as defined above; and wherein the nitrogen atom(s) of the heteroaryl is (are) optionally substituted by $C_{1-4}$alkyl or $C_{1-4}$alkylsulfonyl radical: —$S(O)_nC_{1-4}$alkyl, where n=2;
j) $C_{1-4}$alkyl radical; and
k) $C_{1-4}$alkyl monosubstituted by one of the substituents a) through i) above.

The present invention further relates to a composition useful as a deposit control agent to control the formation, deposition and adherence of scale imparting compounds in an aqueous system containing a biocide comprising chlorine, bromine or mixtures thereof which tends to degrade said deposit control agent,
COMPRISING, IN COMBINATION:
A) a hydroxyalkylidene phosphonate deposit control agent of the formula above;
B) as an additional deposit control agent to enhance the performance of said phosphonate of A), one or more members selected from the group consisting essentially of homo- and copolymers including terpolymers comprising one or more of acrylamide, acrylic acid, 2-acrylamidomethyl propane sulfonic acid, methacrylic acid, itaconic acid, polyether esters of acrylic and methacrylic acids and polyethers based on polyethyleneoxide and polypropyleneoxide and mixtures thereof, including polyethylene glycol monomethacrylate, maleic anhydride, maleic acid, t-butyl acrylamide, sodium styrene sulfonate, sodium vinyl sulfonate, hydroxy propyl acrylate, hydroxy propyl methacrylate, 3-allyloxy-2-hydroxy propane sulfonic acid, sodium salt, and vinyl phosphonic acid, wherein the weight average molecular weight for such polymer additives is in the range of from about 500 to 250,000; and C) an organic sulfonamide stabilizing agent of the formula above which inhibits degradation of the phosphonate deposit control agent A) by the biocide comprising chlorine, bromine or mixtures thereof.

The present invention still further relates to a method of inhibiting the degradation of a hydroxyalkylidene phosphonate used to control the formation, deposition and adherence of scale-forming salts in an aqueous system containing a biocide comprising chlorine, bromine or mixtures thereof which tends to degrade said phosphonate, COMPRISING THE STEP OF TREATING said system with an amount of the organic sulfonamide of the formula above sufficient to provide a concentration ratio of organic sulfonamide to chlorine, bromine or mixture thereof of from 0.5:1 to 2.0:1, respectively. In particular, the present invention relates to such a method in which the treatment step comprises 1) adding the organic sulfonamide stabilizing agent to an aqueous system which already contains the phosphonate deposit control agent dissolved or dispersed therein; or 2) adding the organic sulfonamide stabilizing agent together with the phosphonate deposit control agent to the aqueous system to be treated as a single composition; or 3) adding the organic sulfonamide stabilizing agent either before, or simultaneously, with the phosphonate deposit control agent to the aqueous system to be treated, at the same point or different points in said system, but not as a single composition. In particular, the present invention also relates to the method described above in which calcium carbonate is the scale-forming salt, the aqueous system comprises a cooling tower and has been treated with bromine, and said organic sulfonamide is added to the aqueous system in an amount sufficient to establish a concentration ratio to the bromine of 1:1.

The present invention still further relates to the method described above for inhibiting the degradation of a hydroxyalkylidene phosphonate used to control the formation, deposition and adherence of scale-forming salts in an aqueous system containing a biocide comprising chlorine, bromine or mixtures thereof which tends to degrade said phosphonate, in which an additional deposit control agent to enhance the performance of said phosphonate is included in the treatment and may be added either together with said phosphonate as a single composition, or separately to the aqueous system to be treated at any time or point in said system specified above for addition of the phosphonate deposit control agent;

SAID ADDITIONAL DEPOSIT CONTROL AGENT COMPRISING one or more members selected from the group consisting essentially of: homo- and copolymers including terpolymers comprising one or more of acrylamide (AM), acrylic acid (AA), 2-acrylamide-methyl propane sulfonic acid (AMPSA), methacrylic acid (MAA), ethoxylated methacrylate, itaconic acid (IA), polyether esters of acrylic and methacrylic acids and polyethers based on polyethyleneoxide and polypropyleneoxide and mixtures thereof, including polyethylene glycol monomethacrylate (PGM), maleic anhydride (MAH), maleic acid (MA), t-butyl acrylamide (TBAM), sodium styrene sulfonate, sodium vinyl sulfonate, hydroxy propyl acrylate, hydroxy propyl methacrylate, 3-allyloxy-2-hydroxy propane sulfonic acid (AHPS), sodium salt, and vinyl phosphonic acid, wherein the weight average molecular weight for such polymer additives is in the range of from about 500 to 250,000. In particular, the present invention relates to such a method in which calcium carbonate is the scale-forming salt, the aqueous system comprises a cooling tower and said biocide is bromine, and said additional deposit control agent polymer additive is a member selected from the group consisting essentially of 90/10 to 10/90 AA/AMPSA, preferably 75/25 and 60/40 AA/AMPSA, 100 AA, 75/25 SSS/MA, 33/33/34 AA/MAA/IA, 50/50 AA/AM, 70/20/10 AA/AMPSA/PGM-5, 10 and 20 (having 5, 10 and 20 repeating oxyethylene units, respectively), and AA/AMPSA/TBAM.

DETAILED DESCRIPTION OF THE INVENTION

The present invention relates to an organic sulfonamide stabilizing composition for inhibiting the degradation of hydroxyalkylidene phosphonate scale inhibitors. Since these organic sulfonamide stabilizing agents have been found to be particularly useful with this type of phosphonate scale inhibitor/deposit control agent, the scope of these phosphonates will now be defined.

The Hydroxyalkylidene Phosphonate Scale Inhibitors

The polyether phosphonates comprise compounds of the formula:

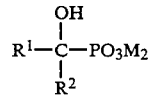

where M is hydrogen or a suitable cation; and $R^1$ and $R^2$ may be the same or different and each is independently selected from:

a) hydrogen: H;
b) carboxylic acid and alkyl esters: —$COOR^3$, where $R^3$ is hydrogen or $C_{1-4}$alkyl;
c) $C_{1-4}$alkoxy;
d) phosphonate/alkylene phosphonate: $(CH_2)_n PO_3 M_2$, where n is 0–4;
e) $C_{1-4}$alkyl, optionally monosubstituted by $R^4$, where $R^4$ is hydroxyl, carboxyl and $C_{1-4}$alkyl esters thereof, and $C_{1-4}$alkoxy;
f) phenyl and phenyl$C_{1-4}$, optionally monosubstituted by $R^4$, where $R^4$ is as defined above;

A preferred subclass of compositions of the above formula is that wherein M is hydrogen, $R^1$ is phosphonate: $PO_3M_2$, and $R^2$ is $C_{1-4}$alkyl. Where $R^2$ is methyl, the preferred compound 1,1-hydroxyethylidene diphosphonic acid (HEDP) results.

Another preferred subclass of compositions of the above formula is that wherein M is hydrogen, $R^1$ is carboxylic acid and alkyl esters: —$COOR^3$, where $R^3$ is hydrogen or $C_{1-4}$alkyl, and $R^2$ is H or $C_{1-4}$alkyl. Where $R^2$ is H, and $R^3$ is H, the preferred compound hydroxyphosphonoacetic acid (HPA), also referred to as 1-phosphonoglycolic acid (PGA) results.

The phosphonte portion of the structure is essential. Whether this group is present initially in the phosphonic acid form or as an alkali metal or other salt of the acid, has no critical bearing on the performance of the overall molecule. At the pH's under which the phosphonate compositions function, they are, and must be, in their ionized form. Thus, it is not critical whether "M" is hydrogen or a suitable cation, and the selection of an appropriate salt form is well within the skill of the art. Alkali metal salts are the most simple, and are preferred for that reason. Overall, however, it is preferred that M is hydrogen.

An essential structural feature of the hydroxyalkylidene phosphonates useful as deposit control agents is the hydroxyl group. However, as already indicated, this group, together with the carbon atom and adjacent phosphonate group, presents a conformation which is partiuclarly susceptible to oxidative attack by chlorine and/or bromine and their active species, with resultant cleavage and release of orthophosphate ion.

Another structural element of the hydroxyalkylidene phosphonate scale inhibitors is the optional carboxyl moiety, which may also be present as the $C_{1-4}$alkyl esters thereof. This group has been found to provide enhanced scale control, and is a constituent of a preferred subclass identified above.

Yet another structural element of the hydroxyalkylidene phosphonate scale inhibitors is the optional phosphonate moiety, which when present gives a diphosphonate structure. This optional group has also been found to provide enhanced scale control, and it is a constituent of a preferred subclass identified above.

The Organic Sulfonamide Stabilizing Agents

The key element of the present invention is the organic sulfonamide stabilizing agents which are used to prevent degradation of the hydroxyalkylidene phosphonate scale inhibitors described above, especially under the severe conditions of high pH and high calcite concentration. These organic sulfonamide stabilizing agents comprise compounds of the formula:

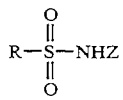

wherein:
Z is selected from hydrogen; and alkali and alkaline earth metal salt-forming ions; and
R is selected from the group consisting essentially of:
a) $C_{1-4}$alkoxy radical: —$OC_{1-4}$alkyl;
b) an amino group, or a mono($C_{1-4}$alkyl)amino or di ($C_{1-4}$alkyl)amino group: —$N(R^1)R^2$, where $R^1$ and $R^2$ are as defined above;
c) a formylamino group: —NHC(O)H;
d) ($C_{1-4}$alkyl)carbonylamino radical: —NHC(O)$C_{1-4}$alkyl;
e) ($C_{1-4}$alkoxy)carbonylamino radical: —NHC(O)O$C_{1-4}$alkyl;
f) $C_{2-6}$alkenyl radical;
g) $C_{2-6}$alkynyl radical;
h) $C_{3-7}$cycloalkyl radical;
i) aryl or heteroaryl selected from the group consisting essentially of phenyl, naphthyl, pyridyl, pyrimidyl, pyrazyl, pyridazyl, pyrrolyl, imidazolyl, pyrazolyl, triazolyl, tetrazolyl; wherein the aryl and carbon atoms of the heteroaryl are optionally substituted with up to three radicals selected from the group consisting essentially of: $C_{1-4}$alkyl; $C_{1-4}$alkoxy; $C_{1-4}$alkoxycarbonyl; halo; nitro; nitrillo; carboxy; $C_{1-4}$alkylsulfonyl radical: —$S(O)_nC_{1-4}$alkyl, where n=2; and a sulfamoyl group which is unsubstituted or substituted on the nitrogen by one or two $C_{1-4}$alkyl groups: —$SO_2N(R^1)R^2$, where $R^1$ and $R^2$ are as defined above; and wherein the nitrogen atom(s) of the heteroaryl is (are) optionally substituted by $C_{1-4}$alkyl or $C_{1-4}$alkylsulfonyl radical: —$S(O)_nC_{1-4}$alkyl, where n=2;
j) $C_{1-4}$alkyl radical; and
k) $C_{1-4}$alkyl monosubstituted by one of the substituents a) through i) above.

Preferred organic sulfonamide stabilizing agents for use in the present invention are those set out above wherein R is:
$C_{1-4}$alkoxy radical: —$OC_{1-4}$alkyl;
an amino group, or a mono($C_{1-4}$alkyl)amino or di($C_{1-4}$alkyl)amino group: —$N(R^1)R^2$, where $R^1$ and $R^2$ are independently H or $C_{1-4}$alkyl;
phenyl mono-substituted by $C_{1-4}$alkyl, $C_{1-4}$alkoxy, or —$SO_2N(R^1)R^2$, where $R^1$ and $R^2$ are as defined above;
$C_{1-4}$alkyl radical; or $C_{1-4}$alkyl monosubstituted by one of the substituents set out immediately above.

An especially preferred class of organic sulfonamides useful in the present invention is that wherein R is phenyl monosubstituted by $C_{1-4}$alkyl, and more particularly, para-substituted by methyl.

The organic sulfonamides described above are, for the most part, known in the art, and methods for their preparation are well known. One satisfactory approach to preparation of these compounds is by sulfonation of the appropriate amine with sulfur trioxide: $SO_3$. Another synthetic approach which may be used to prepare the organic sulfonamide stabilizers of the present invention is by treating ammonia, a primary amine, or a secondary amine with a sulfonyl chloride in the presence of some base. These and other methods are described in *Comprehensive Organic Chemistry: the Synthesis and Reactions of Organic Compounds*, Vol. 3, pp. 345–346, Derek Barton and W. David Ollis, eds., Pergamon Press 1979, as well as the literature references cited therein.

Other Aspects of the Compositions and Methods of the Present Invention

When any of the hydroxyalkylidene phosphonates used in the compositions of the present invention are used to inhibit the precipitation, deposition, and adherence of scale-forming salts in an aqueous system, they can be effectively employed for that purpose when added in amounts sufficient to establish a concentration in said aqueous system of from 1 to 100 mg/L. Preferably, the amount added will be sufficient to establish a concentration of from 5 to 75 mg/L, and most preferably, the amount added will be sufficient to establish a concentration of from 10 to 50 mg/L of the composition. It is understood, however, that many factors, of the type which have been explained in detail with regard to the background to the present invention, will determine the actual amount of the hydroxyalkylidene phosphonate compositions of the present invention which will be added to any particular aqueous system in order to achieve the maximum amount of inhibition of alkaline earth metal, especially calcium carbonate scale formation, deposition and adherence in that aqueous system. The calculation of those amounts is well within the skill of the artisan in this field.

When the hydroxyalkylidene phosphonate compositions of the present invention are used in combination with one or more of the polymers recited further above, the amounts of that combination which must be added in order to inhibit the formation, deposition and adherence of scale-forming salts in an aqueous system, will as a general matter be within the ranges of amounts sufficient to establish the ranges of concentrations of the hydroxyalkylidene phosphonate used alone, as recited in detail above. Again, however, calculation of the actual amount is well within the skill of the art.

The overall amount, and particularly the concentration of organic sulfonamide stabilizing agent which must be employed in the method of the present invention for inhibiting the degradation of the hydroxyalkylidene phosphonates used as scale inhibitors, depends on a number of factors, including especially pH, concentration of the chlorine and/or bromine biocide, and temperature and organic and inorganic constituents of the water which makes up the aqueous system being treated. With regard particularly to the concentration of the chlorine and/or bromine biocide in the aqueous system, it is desirable that the corresponding concentration of the organic sulfonamide stabilizing agent be in an equivalent weight ratio thereto (sulfonamide:halogen) of from 0.5 to 2.0, preferably from 0.75 to 1.25, most preferably about 1.0. In general terms, the concentration of the organic sulfonamide will be from 0.1 to 100 ppm, preferably from 0.5 to 25, most preferably from 1 to 10 ppm in the aqueous system being treated by the hydroxyalkylidene phosphonate scale inhibitor. For example, the organic sulfonamide stabilizing agents of the present invention will be added to such an aqueous system at a concentration of between 0.5 and 25 ppm, said system being at a pH of from 6 to 10, at a temperature of from 10° to 80° C., and having a chlorine and/or bromine concentration of between 0.1 and 50 ppm, usually 0.1 to 10 ppm.

The manner of addition of any particular organic sulfonamide stabilizing agent composition of the present invention to an aqueous system will be straightforward to a person of ordinary skill in this art. It may be added in liquid form by mechanical dispensers of known design. It may also be added in diluted liquid form. The organic sulfonamide stabilizing agent may also be combined with the hydroxyalkylidene phosphonate scale inhibitor composition, as well as other chemical treatment agents for dispensing to the aqueous system; and these in combination may be dispensed in liquid form.

As has already been noted, the present invention relates to a method in which the treatment step comprises 1) adding the organic sulfonamide stabilizing agent to an aqueous system which already contains the phosphonate deposit control agent dissolved or dispersed therein; or 2) adding the organic sulfonamide stabilizing agent together with the phosphonate deposit control agent to the aqueous system to be treated as a single composition; or 3) adding the organic sulfonamide stabilizing agent either before, or simultaneously, with the phosphonate deposit control agent to the aqueous system to be treated, at the same point or different points in said system, but not as a single composition. All that is required, essentially, is that the phosphonate scale inhibitor and the organic sulfonamide stabilizing agent be present in the aqueous system being treated at the same time when that system contains a chlorine and/or bromine biocide which has a tendency to degrade said phosphonate scale inhibitor. From the standpoint of convenience, is preferred, of course, to adopt the procedure of 2) above and simply add the phosphonate scale inhibitor and the organic sulfonamide stabilizing agent together as a single treatment composition to the aqueous system.

The method of the present invention also contemplates use of an additional polymer deposit control agent to enhance the performance of the phosphonate scale inhibitor, which may be added either together with said phosphonate as a single composition, or separately to the aqueous system to be treated at any time or point in said system for addition of the phosphonate. For example, there could be used in such a combination one or more members selected from the group consisting of homopolymers, copolymers and terpolymers comprising one or more monomers of acrylamide (AM), acrylic acid (AA), 2-acrylamide-methyl propane sulfonic acid (AMPSA), methacrylic acid (MAA), ethoxylated methacrylate, itaconic acid (IA), polyether esters of acrylic and methacrylic acids and polyethers based on polyethyleneoxide and polypropyleneoxide and mixtures thereof, including polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), and vinyl phosphonic acid. Weight average molecular weights for such polymer additives should range from about 500 to 250,000.

For example, such compositions include copolymers of 90/10 to 10/90 AA/AMPSA, preferably 75/25 and 60/40 AA/AMPSA. Other preferred polymer additives for use with the hydroxyalkylidene phosphonate N-oxides of the present invention include 100 AA, 75/25 SSS/MA, 33/33/34 AA/MAA/IA, 50/50 AA/AM, 70/20/10 AA/AMPSA/PGM-5, 10 and 20 (having 5, 10 and 20 repeating oxyethylene units, respectively), and AA/AMPSA/TBAM. Combinations using these polymers together with the hydroxyalkylidene phosphonate compositions increase the amount of scale control and deposit control which is achieved, especially under the severe conditions described herein. The ratio of polymer additive to phosphonate can be as high as 1:1 down to as little as 1:10, with the preferred range being between 1:2 and 1:5.

As has already been noted, the chlorine and bromine biocides are added to the aqueous systems being treated in accordance with well-known procedures using various chlorine- and bromine-releasing agents, and sometimes the free halogen itself. For example, in the case of chlorine, gaseous chlorine may be fed directly into the water of the aqueous system, or it may be introduced by addition of the sodium or calcium hypochlorite salt, or other chlorine donors which are commonly used. For bromine, suitable bromide salts which may be used include the alkali and alkaline earth metal bromides, e.g., magnesium bromide, calcium bromide, sodium bromide, potassium bromide, ammonium bromide, especially crystalline sodium bromide dihydrate, etc.

Concerning the organic sulfonamide stabilizing agents of the present invention and their use, the phrase "inhibiting the degradation", with regard to their effect on the phosphonate scale inhibitors, is intended to mean all degrees of such inhibition, up to and including, total prevention of such degradation by the chlorine and/or bromine biocides which tend to cause such degradation. The term "degradation", in turn, means primarily cleavage of the methylenephosphonate group or groups in the phosphonate scale inhibitor product whereby orthophosphate ion is released with the detrimental effects described earlier, together with total or partial loss of the scale inhibiting activity of the phosphonate product. The term "degradation", however, is also intended to mean any decomposition, deterioration, or other detrimental change in composition of the phosphonate scale inhibitors used herein, which is caused directly or indirectly by the chlorine and/or bromine biocides present in the aqueous system to which the phosphonate scale inhibitors are added, and which is inhibited by the organic sulfonamide stabilizing agents of the present invention.

With regard to the phosphonate scale inhibitors, as well as their combination with the polymer additives described above, the phrases "inhibiting the precipitation" and "inhibiting the formation and deposition" are meant to include threshold inhibition, dispersion, solubilization, or particle size reduction. The phrases "inhibiting the adherence" and "increasing the non-adherence", are meant to define the formation of a scale deposit which is easily removed, e.g., by simple rinsing, i.e., a scale deposit which is not so firmly bonded to the surface to which it is attached that it cannot be removed by simple physical means as opposed to harsh mechanical or chemical treatment.

The phrase "scale-forming salts" is meant to include any of the scale-forming salts, including, but not limited to, calcium carbonate, calcium sulfate, calcium phosphate, calcium phosphonate (including calcium hydroxyethylidene diphosphonic acid), calcium oxalate, calcium fluoride, barium carbonate, barium sulfate, and the corresponding magnesium salts.

The phrase "aqueous system" means commercial or industrial systems utilizing water and involving heat exchange surfaces, usually of metal, including cooling water systems having cooling towers, boiler water systems, desalination systems, gas scrubbers, and thermal conditioning equipment.

In the embodiments of the present invention described herein, it has been contemplated that, as a practical matter, only a single hydroxyalkylidene phosphonate composition of those described above would be used for the purpose of inhibiting scale. Of course, it would be possible to employ more than one such compound, and that forms a part of the present invention.

EXAMPLES OF PREFERRED EMBODIMENTS

The following examples are presented for the purpose of illustrating the present invention, but are not intended to be in any way a limitation thereof.

EXAMPLE 1

General Procedure for Evaluation of Phosphonate Decomposition

The decomposition of hydroxyalkylidene phosphonates was measured by following the rate of appearance of orthophosphate, which is a decomposition product. Tests were run in 8 liter cells equipped with pH and temperature controls, and containing water of the composition set out below:

| Ion | mg/L |
|---|---|
| $Ca^{2+}$ | 100 |
| $Mg^{2+}$ | 25 |
| $Na^+$ | 75 |
| $SO_4^{2-}$ | 200 |
| $SiO_2$ | 18 |
| $Cl^-$ | 200 |
| Alkalinity (as $HCO_3^-$): for | |
| pH 7.5 | 86 |
| pH 8.5 | 309 |

The hydroxyalkylidene phosphonate HEDP was added to the test vessel so as to result in a concentration of 10 mg/L in the water therein. Chlorinations were performed by pipeting the appropriate amount of 8.0 g/L chlorine as $Cl_2$ into the 8 liter test cells to attain the desired residual. This stock solution was prepared fresh daily and standardized using the Calgon Methyl Orange Field Test for chlorine. Bromine was added semi-continuously to maintain 0.6 ppm of bromine (as $Cl_2$), and bromine levels were determined using the Calgon Field Test for bromine. The bromine stock was made by combining equal molar concentrations of sodium hypochlorite and sodium bromide. The sodium bromide stock solution contained 11.61 g of NaBr per liter, which is equivalent to 8 g/L as chlorine on a molar basis. For these tests, two milliliters of NaBr and HOCl were combined, resulting in a 4 g/L bromine solution (measured as active chlorine). This solution converts all chlorine to bromine. An aliquot of this solution was then added to the test cell to achieve the desired bromine concentration. During the tests, halogen levels were determined frequently. Additonal slugs of halogen were added when needed to maintain free halogen residuals between 0.4 and 0.6 ppm.

Temperature was maintained at 30.6° C., while the pH was maintained continuously at 7.5±0.2 with the addition of 1% sulfuric acid as needed. Samples were taken at regular intervals for orthophosphate analysis. From these, degradation rates were calculated. Total and orthophosphate were analyzed using standard procedures. Total phosphate is the combination of organic and orthophosphate. Total phosphate was determined after digestion by boiling in the presence of acid and persulfate. Orthophosphate determination involves its reaction with ammonium molybdate and antimony potassium tartrate to form an antimony-phosphate-molybdate complex. Both procedures rely on this complex being further reduced by ascorbic acid to produce molybdenum blue. The color intensity is a function of concentration amenable to measurement with a spectrophotometer.

Following the procedures described above, the halogen stability, i.e., the % phosphonate remaining in solution after certain elapsed times, was determined for the starting material. The percent orthophosphate released is the amount of orthophosphate found divided by the total amount of orthophosphate that would be available if 100% decomposition occurred.

A comparison was also made of the ability of sulfamic acid, a known stabilizer for chlorine, and methylsulfonamide (MSA), a stabilizing agent of the present invention, to prevent decomposition of the starting material phosphonate described above. The results obtained are illustrated in the following table of values.

TABLE 1

| | Orthophosphate Release by 10 ppm HEDP In the Presence of 0.6 ppm Br$_2$ | | |
|---|---|---|---|
| TIME (Hrs.) | NO STABILIZER % o-PO$_4$ Released | 2 ppm MSA % o-PO$_4$ Released | 2 ppm SULFAMIC ACID % o-PO$_4$ Released |
| 0.17 | 8.5 | — | — |
| 0.5 | 12.95 | 2.0 | 3.0 |
| 0.75 | 16.8 | — | — |
| 1.0 | 22.7 | 2.4 | 3.6 |
| 1.5 | — | 3.1 | 4.4 |
| 2.0 | 38.7 | 3.4 | 5.3 |
| 3.0 | 53.3 | 4.2 | 5.8 |
| 4.0 | 70.0 | 5.2 | 6.3 |
| 5.0 | 79.0 | 5.7 | 6.9 |
| 6.0 | 83.4 | 5.9 | 8.5 |
| 7.0 | — | 6.0 | 11.2 |
| 9.0 | 96.7 | 7.5 | 11.3 |
| 10.0 | — | 8.0 | 11.3 |
| 11.0 | — | 8.8 | 11.6 |
| 12.0 | — | — | 12.4 |
| 13.0 | — | 9.2 | 12.9 |
| 14.0 | — | 9.5 | 13.2 |
| 15.0 | — | 9.7 | 13.7 |
| 16.0 | — | 9.9 | 14.1 |

As shown by the data above, within 6 hours, approximately 83% of the phosphonate test compound without stabilizing agent had decomposed. The test data above also shows that while the sulfamic acid was effective in reducing the rate of decomposition of the phosphonate test sample by bromine, it was not as effective as the MSA, which was better by a factor of 1.4 in retarding the decomposition of the HEDP by bromine. After 6 hours, the decomposition was reduced from about 83% with no stabilizer to about 8.5% with sulfamic acid, and to about 5.97% with MSA.

EXAMPLE 2

MSA Compared to Urea and Dimethylhydantoin

Following the procedures of Example 1 above, methanesulfonamide (MSA), a stabilizing agent of the present invention, was evaluated for its ability to inhibit the decomposition of the same phosphonate scale inhibitor as used in Example 1, by bromine, as compared to urea and dimethylhydantoin (DMH). The results of that evaluation are shown in the following table of values.

TABLE 2

| | Orthophosphate Release by 10 ppm HEDP In the Presence of 0.6 ppm Br$_2$ | | | |
|---|---|---|---|---|
| TIME (Hrs.) | NO STBLZ. % o-PO$_4$ Released | 2 ppm MSA % o-PO$_4$ Released | 2 ppm Urea % o-PO$_4$ Released | 2 ppm DMH % o-PO$_4$ Released |
| 0.17 | 8.5 | — | — | — |
| 0.5 | 12.9 | 2.0 | — | 12.6 |
| 0.75 | 16.8 | — | — | — |
| 1.0 | 22.7 | 2.4 | 17.6 | 20.7 |
| 1.5 | — | 3.1 | 21.5 | 26.1 |
| 2.0 | 38.7 | 3.4 | 25.3 | 34.0 |
| 3.0 | 53.3 | 4.2 | 32.8 | 45.1 |
| 4.0 | 70.0 | 5.2 | 41.4 | 52.2 |
| 5.0 | 79.0 | 5.7 | 49.2 | 59.9 |
| 6.0 | 83.4 | 5.9 | 56.1 | 66.5 |
| 7.0 | — | 6.0 | 65.0 | 74.3 |
| 9.0 | 96.7 | 7.5 | 79.2 | 88.6 |
| 10.0 | — | 8.0 | 82.2 | 87.6 |
| 11.0 | — | 8.8 | 85.1 | 93.2 |
| 12.0 | — | — | — | 93.8 |
| 13.0 | — | 9.2 | 88.3 | 93.1 |
| 14.0 | — | 9.5 | 88.7 | — |
| 15.0 | — | 9.7 | 90.8 | 92.9 |
| 16.0 | — | 9.9 | 92.0 | — |

EXAMPLE 3

Stabilization with Toluenesulfonamide (TSA)

Following the procedures in Example 1 above, toluenesulfonamide (TSA), another stabilizing agent of the present invention, was evaluated for its ability to inhibit the decomposition of the same scale inhibitor as used in Examinple 1, by bromine present in a 0.5 ppm concentration, rather than 0.6 ppm. The results of that evaluation are shown in the following table of values.

TABLE 3

| | Orthophosphate Release by 10 ppm HEDP In the Presence of 0.5 ppm Br$_2$ | |
|---|---|---|
| TIME (Hrs.) | NO STBLZ. % o-PO$_4$ Released | 2 ppm TSA % o-PO$_4$ Released |
| 0.25 | 4.17 | — |
| 0.50 | — | 1.58 |
| 0.75 | 11.0 | — |
| 1.0 | 16.99 | 1.74 |
| 1.5 | 22.89 | 1.78 |
| 2.0 | 27.95 | 2.74 |
| 3.0 | 38.81 | 3.29 |
| 4.0 | 48.83 | 3.36 |
| 5.0 | 56.32 | 4.21 |
| 6.0 | 61.10 | 4.49 |
| 7.0 | — | 5.25 |
| 24.0 | — | 9.06 |
| 25.0 | — | 9.55 |
| 26.0 | — | 10.12 |
| 27.0 | — | 9.78 |
| 28.0 | — | 10.09 |
| 29.0 | — | 10.36 |
| 30.0 | — | 10.38 |

What is claimed is:

1. An aqueous system containing scale-forming salts and characterized by high calcite saturation wherein the pH is from 6.0 to 10.0, and further characterized by the presence of a biocide therein comprising chlorine or bromine or mixtures thereof;

said aqueous system further containing, in an amount sufficient to establish a concentration of from 10 to 50 mg/L, of a hydroxyalkylidene phosphonate of the formula:

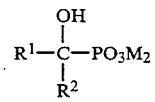

where M is hydrogen or a suitable cation; and $R^1$ and $R^2$ may be the same or different and each is independently selected from:
    a) hydrogen: H;
    b) carboxylic acid and alkyl esters: —COOR$^3$, where $R^3$ is hydrogen or C$_{1-4}$alkyl;
    c) C$_{1-4}$alkoxy;
    d) phosphonate/alkylene phosphonate: (CH$_2$)$_n$PO$_3$M$_2$, where n is 0–4;

e) C$_{1-4}$alkyl, optionally monosubstituted by R$^4$, where R$^4$ is hydroxyl, carboxyl and C$_{1-4}$alkyl esters thereof, and C$_{1-4}$alkoxy;

f) phenyl and phenylC$_{1-4}$alkyl, optionally monosubstituted by R$^4$, where R$^4$ is as defined above;

said phosphonate being subject to degradation by said biocide, wherefore said aqueous system also further contains an organic sulfonamide stabilizing composition for inhibiting said degradation comprising a compound of the formula:

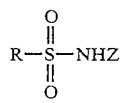

wherein:

Z is selected from hydrogen; and alkali and alkaline earth metal salt-forming ions; and R is methyl, phenyl, or phenyl substituted by methyl; sufficient to provide a concentration ratio, based on equivalent weights, of organic sulfonamide to chlorine, bromine or mixture thereof of from 0.5:1 to 2.0:1, respectively.

2. An aqueous system according to claim 1 wherein the phosphonate is 1,1-hydroxyethylidene diphosphonic acid (HEDP).

3. An aqueous system according to claim 1 wherein for said hydroxyalkylidene phosphonate, M is hydrogen, R$^1$ is PO$_3$M$_2$, and R$^2$ is C$_{1-4}$alkyl.

4. An aqueous system according to claim 1 wherein said organic sulfonamide stabilizing composition is selected from the group consisting of toluenesulfonamide, methane sulfonamide, and benzene sulfonamide.

5. An aqueous system according to claim 1 wherein for said hydroxyalkylidene phosphonate, M is hydrogen, R$^1$ is carboxylic acid or alkyl esters of the form —COOR$^3$, where R$^3$ is hydrogen or C$_{1-4}$alkyl, and R$^2$ is hydrogen or C$_{1-4}$alkyl.

6. An aqueous system according to claim 5 wherein for said hydroxyalkylidene phosphonate, R$^2$ is hydrogen, and R$^3$ is hydrogen.

7. An aqueous system according to claim 6 wherein said organic sulfonamide stabilizing composition is toluenesulfonamide.

8. An aqueous system containing scale-forming salts and characterized by high calcite saturation wherein the pH is from 6.0 to 10.0 and further characterized by the presence of a biocide therein comprising chlorine or bromine or mixtures thereof;

said aqueous system further containing, in an amount sufficient to establish a concentration of from 10 to 50 mg/L, of a hydroxyalkylidene phosphonate of the formula:

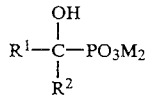

where M is hydrogen or a suitable cation; and R$^1$ and R$^2$ may be the same or different and each is independently selected from:

a) hydrogen: H;

b) carboxylic acid and alkyl esters: —COOR$^3$, where R$^3$ is hydrogen or C$_{1-4}$alkyl;

c) C$_{1-4}$alkoxy;

d) phosphonate/alkylene phosphonate: (CH$_2$)$_n$PO$_3$M$_2$, where n is 0-4;

e) C$_{1-4}$alkyl, optionally monosubstituted by R$^4$, where R$^4$ is hydroxyl, carboxyl and C$_{1-4}$alkyl esters thereof, and C$_{1-4}$alkoxy;

f) phenyl and phenylC$_{1-4}$alkyl, optionally monosubstituted by R$^4$, where R$^4$ is as defined above;

said phosphonate being subject to degradation by said biocide, wherefore said aqueous system also further contains an organic sulfonamide stabilizing composition for inhibiting said degradation comprising a compound of the formula:

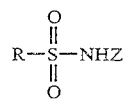

wherein:

Z is selected from hydrogen; and alkali and alkaline earth metal salt-forming ions; and R is methyl, phenyl, or phenyl substituted by methyl; sufficient to provide a concentration ratio, based on equivalent weights, of organic sulfonamide to chlorine, bromine or mixture thereof of from 0.5:1 to 2.0:1, respectively; and said aqueous system also further contains an additional deposit control agent to enhance the performance of said hydroxyalkylidene phosphonate with one or more homo-polymers, copolymers, and terpolymers comprising one or more of acrylamide (AM), acrylic acid (AA), 2-acrylamidomethyl propane sulfonic acid (AMPSA), methacrylic acid (MAA), itaconic acid (IA), polyether esters of acrylic and methacrylic acids and polyethers based on polyethyleneoxide and polypropyleneoxide and mixtures thereof, including polyethylene glycol monomethacrylate (PGM), maleic anhydride (MAH), maleic acid (MA), t-butyl acrylamide (TBAM), sodium styrene sulfonate (SSS), sodium vinyl sulfonate, hydroxy propyl acrylate, hydroxy propyl methacrylate, 3-allyloxy-2-hydroxy propane sulfonic acid (AHPS), sodium salt, and vinyl phosphonic acid, wherein the weight average molecular weight for such polymer additives is in the range of from about 500 to 250,000.

9. An aqueous system according to claim 8 wherein said additional deposit control agent is a member selected from the group consisting essentially of AA-/AMPSA, AA, SSS/MA, AA/MAA/IA, AA/AM, AA/AMPSA/PGM-5, 10 and 20 (having 5, 10 and 20 repeating oxyethylene units, respectively), and AA-/AMPSA/TBAM.

10. An aqueous system according to claim 9 wherein for said hydroxyalkylidene phosphonate, M is hydrogen, R$^1$ is phosphonate: PO$_3$M$_2$, and R$^2$ is C$_{1-4}$alkyl; said polymer additive is AA/AMPSA/PGM-5 (having 5 repeating oxyethylene units); and said organic sulfonamide stabilizing composition is toluenesulfonamide.

11. An aqueous system according to claim 10 wherein R$^2$ is methyl, and said hydroxyalkylidene phosphonate is 1,1-hydroxyethylidene diphosphonic acid (HEDP).

12. An aqueous system according to claim 9 wherein for said hydroxyalkylidene phosphonate, M is hydrogen, R$^1$ is carboxylic acid or alkyl esters of the form —COOR$^3$, where R$^3$ is hydrogen or C$_{1-4}$alkyl, and R$^2$ is H or C$_{1-4}$alkyl; said polymer additive is AA/AMPSA/PGM-5 (having 5 repeating oxyethylene units); and said organic sulfonamide stabilizing composition is toluenesulfonamide.

13. An aqueous system according to claim 12 wherein $R^2$ is H, and $R^3$ is H, and said hydroxyalkylidene phosphonate is hydroxyphosphonoacetic acid (HPA), also referred to as 1-phosphonoglycolic acid (PGA).

14. A composition useful as a deposit control agent to control the formation, deposition and adherence of scale imparting compounds in an aqueous system containing a biocide comprising chlorine, bromine or mixtures thereof which tends to degrade said deposit control agent, COMPRISING, IN COMBINATION:

A) a hydroxyalkylidene phosphonate deposit control agent of the following formula:

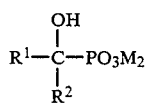

where M is hydrogen; $R^1$ is phosphonate: $PO_3M_2$ and $R^2$ is $C_{1-4}$alkyl;

B) an additional deposit control agent to enhance the performance of said phosphonate of A), wherein said additional deposit control agent is acrylic acid (AA)/2-acrylamidomethyl propane sulfonic acid (AMPSA)/polyethylene glycol monomethacrylate (PGM)-5, 10 and 20 (having 5 repeating oxyethylene units), wherein the weight average molecular weight of said additional deposit control agent is in the range of from about 500 to 250,000; and C) An organic sulfonamide stabilizing composition which inhibits degradation of the phosphonate deposit control agent A) by the biocide comprising chlorine, bromine or mixtures thereof comprising a compound of the formula:

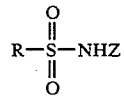

wherein said organic sulfonamide stabilizing composition is toluene sulfonamide.

15. A composition according to claim 14 wherein $R^2$ is methyl, and said phosphonate deposit control agent A) is 1,1-hydroxyethylidene diphosphonic acid (HEDP).

16. A composition according to claim 14 wherein for said phosphonate deposit control agent A) M is hydrogen, $R^1$ is carboxylic acid or alkyl esters of the form —COOR$^3$, where $R^3$ is hydrogen or $C_{1-4}$alkyl, and $R^2$ is H or $C_{1-4}$alkyl; said additional deposit control agent B) is AA/AMPSA/PGM-5 (having 5 repeating oxyethylene units); and said organic sulfonamide stabilizing composition is toluenesulfonamide.

17. A composition according to claim 16 wherein $R^2$ is H, and $R^3$ is H, and said deposit control agent is hydroxyphosphonoacetic acid (HPA), also referred to as 1-phosphonoglycolic acid (PGA).

* * * * *